UNITED STATES PATENT OFFICE.

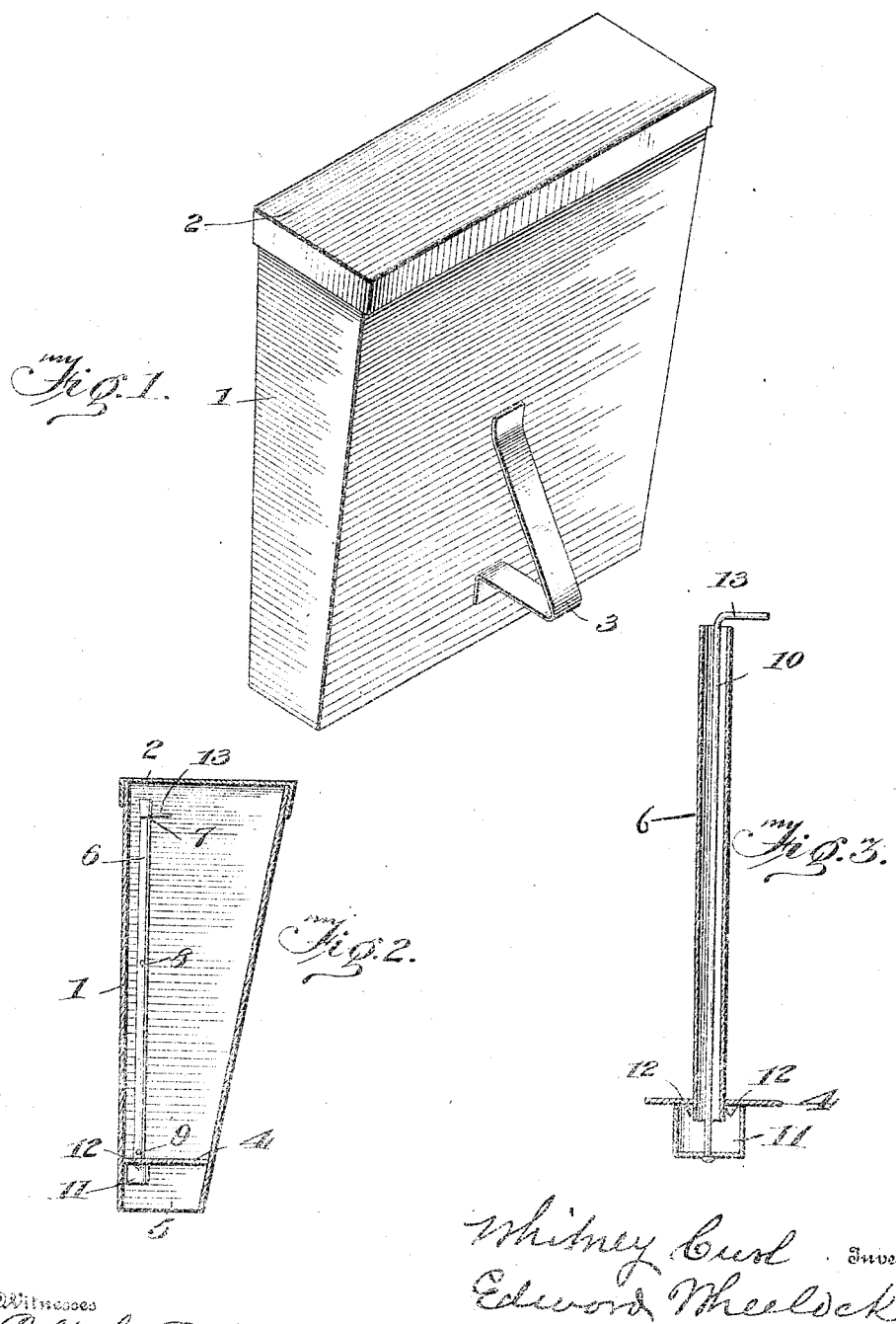

WHITNEY CURL AND EDWARD WHEELOCK, OF HOT SPRINGS, ARKANSAS.

ICE-TANK.

No. 901,692.  Specification of Letters Patent.  Patented Oct. 20, 1908.

Application filed September 10, 1907. Serial No. 392,175.

*To all whom it may concern:*

Be it known that we, WHITNEY CURL and EDWARD WHEELOCK, citizens of the United States, residing at Hot Springs, in the county of Garland and State of Arkansas, have invented certain new and useful Improvements in Ice-Tanks, of which the following is a specification.

Our invention is an ice-tank, which may be used to great advantage in any ice-box, refrigerator or chest, used for the purpose of storing, and keeping in good condition, perishable products such as fresh meats, fish, vegetables, butter and milk etc.

The tank when used is filled with salt and ice.

The principal advantage over ordinary ice-tanks now in use is in the matter of the drain-pipe with its outlets, which can be opened or closed at different places along its length, and thus regulate the quantity of brine to be accumulated and retained in the tank, as the operator may desire, and so regulating the temperature of the air in the ice-box. Thus, by retaining a certain quantity of brine in the tank, all the cold is utilized, thereby saving about one third of the expense of ice over the ordinary mode of using ice.

The top of the tank being larger than the bottom makes a wedge-shaped interior, thus holding the ice in place up toward the top of the tank where it will naturally give the best service, and insure practically an even temperature throughout the box.

Experience teaches us that when ice is broken and mixed with salt, and placed in an ordinary square tank, without the drain-pipe, it becomes an additional expense instead of a saving of ice, for as the ice melts it settles toward the bottom of the tank, leaving the atmosphere in the top of the box without the advantage of ice; therefore it gets warm, while our tank holds the ice in place thus cooling the box more uniformly.

In the accompanying drawings, Figure 1, is a perspective view of our ice-tank. Fig. 2, is a vertical cross sectional view of our ice-tank. Fig. 3, is a vertical sectional view of the drain-pipe, showing the rod and cup attached thereto.

Similar numerals refer to similar parts throughout the several views.

Our invention is described as follows:—

The numeral 1, represents the receptacle of the tank; 2, the lid and 3, the foot to hold it in an upright position. It will be seen that the tank is larger at the top than at the bottom. The bottom 4, is some little distance above the lower edges of the walls of the tank, which walls terminate in a depending flange.

Situated in one corner, or against the walls of the tank, is a drain-pipe 6, provided with inlet perforations 7, 8 and 9; said drain-pipe passes some little distance through the said bottom 4. A rod 10, passes down through said drain-pipe, from its top end to a little distance below its lower end, and to the lower end of said rod is rigidly secured a cup 11, which surrounds the lower end of said drain-pipe 6, which cup is provided with drain-openings 12, otherwise the upper end of the cup fits up against the bottom 4, of the tank. The upper end of said rod 10, turns at right angles to itself, forming a lever 13, by which it may be turned and thereby turn the said cup 11.

The upper end of the drain-pipe, and the inlet-openings may be closed by proper stoppers and opened at will of the operator.

The purpose of the rod 10, and cup 11, is that the cup, when filled with water, traps or closes, air-tight, any opening at the end of the drain-pipe, thus preventing any passage of air into the tank.

If, at any time, the mothery substance, created by the mixing of salt and ice, should accumulate and clog the openings 12, a turn of the lever 13, will remove the clot, thus allowing the free passage of the accumulated brine. In case that any foreign matter, such as saw-dust, sand or splinters of wood, should accumulate to such extent as to fill the cup, the rod, by first bending said lever up, may be passed entirely through the drain-pipe, thus removing the cup for the purpose of a thorough cleaning.

Although we have specifically described the combination, construction and arrangement of the several parts of our invention, we do not confine ourselves particularly to such specific combination construction and arrangement, as we claim the right to make such changes and modification therein as may clearly fall within the scope of our invention, and which may be resorted to without departing from the spirit, or sacrificing any of our patentable rights therein.

Having described our invention, what we claim as new and desire to secure by Letters Patent, is:—

1. The combination of a receptacle 1; a lid 2, fitting on top of said receptacle; a foot 3, extending from one of the walls of said receptacle; a drain-pipe 6, provided with inlet openings 7, 8 and 9, secured to the inner face of one of the walls of said receptacle, its lower end extending a little below the bottom 4, of said receptacle; a flange 5, extending downwardly from the bottom 4, of said receptacle; a rod 10, passing down through said pipe, and having its upper end turned at right-angles to its body, forming a lever 13, and a cup 11, provided with openings 12, in its upper edge, rigidly secured to the lower end of said rod, substantially as shown and described and for the purposes set forth.

2. The combination of a receptacle; a lid, fitting on the top of said receptacle; a drain-pipe, provided with inlet openings, secured to the inner face of the walls of the said receptacle, its lower end passing through the bottom of said receptacle; a depending flange extending from the bottom of said receptacle; a rod, passing through said drain-pipe, and a cup provided with openings in its upper edge rigidly secured to the lower end of said rod, with means for holding said tank in an upright position, and for rotating said rod and cup, substantially as shown and described and for the purposes set forth.

In testimony whereof we affix our signatures in presence of two witnesses.

WHITNEY CURL.
EDWARD WHEELOCK.

Witnesses:
ALPHONZO CURL,
HARRY J. SMITH.